(12) United States Patent
Lin

(10) Patent No.: US 7,252,033 B1
(45) Date of Patent: Aug. 7, 2007

(54) AUTOMATIC COFFEE MAKER

(75) Inventor: Yu-Yuan Lin, Tainan (TW)

(73) Assignee: Uni-Splendor Corp, Tainan (TW)

( * ) Notice: Subject to any disclaimer, the term of this patent is extended or adjusted under 35 U.S.C. 154(b) by 0 days.

(21) Appl. No.: 11/308,251

(22) Filed: Mar. 14, 2006

(51) Int. Cl.
*A47J 31/42* (2006.01)
*A47J 42/12* (2006.01)
*A47J 42/16* (2006.01)
*A47J 31/00* (2006.01)

(52) U.S. Cl. .................. 99/286; 99/289 R; 99/304; 99/305; 99/306; 99/352; 99/355; 99/509; 99/510; 99/323; 99/323.3; 241/261.1; 241/261.2; 241/33; 241/34; 241/35; 241/36; 241/37; 241/186.3

(58) Field of Classification Search .......... 99/352–355, 99/509–513, 348, 495, 286, 287–307, 323, 99/323.3; 241/33–37, 65, 79.1, 100, 259.1, 241/101.1, 245, 101.2, 81, 101.6, 261, 261.1, 241/261.2, 186.3
See application file for complete search history.

(56) References Cited

U.S. PATENT DOCUMENTS

| | | | | |
|---|---|---|---|---|
| 1,189,035 A | * | 6/1916 | Asbury et al. | 241/100 |
| 3,107,600 A | * | 10/1963 | Brun-Buisson | 99/286 |
| 3,327,615 A | * | 6/1967 | Swan | 99/286 |
| 4,007,675 A | * | 2/1977 | Cailliot et al. | 99/286 |
| 4,196,658 A | * | 4/1980 | Takagi et al. | 99/286 |
| 4,396,515 A | * | 8/1983 | Sturwold | 508/413 |
| 5,193,438 A | * | 3/1993 | Courtois | 99/286 |
| 5,285,705 A | * | 2/1994 | Buttle et al. | 99/280 |
| 5,465,650 A | * | 11/1995 | Friedrich et al. | 99/286 |
| 5,542,342 A | * | 8/1996 | McNeill et al. | 99/280 |
| 5,615,601 A | * | 4/1997 | Eugstar | 99/280 |
| 5,671,657 A | * | 9/1997 | Ford et al. | 99/286 |
| 5,850,859 A | * | 12/1998 | Ciaurriz Andueza | 141/361 |
| 5,865,095 A | * | 2/1999 | Mulle | 99/293 |
| 6,095,032 A | * | 8/2000 | Barnett et al. | 99/286 |
| 6,827,002 B1 | * | 12/2004 | Lin | 99/286 |

* cited by examiner

*Primary Examiner*—Keith Hendricks
*Assistant Examiner*—Viren Thakur
(74) *Attorney, Agent, or Firm*—Alan Kamrath; Kamrath & Associates P.A.

(57) ABSTRACT

A coffee maker includes a valve mechanism having a micro switch, an electromagnetic valve, a magnetic covering board activated by the electromagnetic valve for opening or closing a powder path, and a spring interconnecting the covering board and the electromagnetic valve. A motor-driven grinding mechanism includes two ring-shaped outer grinding members having teeth facing each other, and a spring biased inner grinding member including a hollow feed rod with a lead screw formed thereon. A powder fineness adjusting mechanism includes an adjustment lever. In a powder fineness adjustment for producing coarse coffee powder, pivoting the lever toward one direction will pivot an abutment member and move the same outward to push one grinding member for increasing a space between the grinding members filled with coffee beans to be ground. Pivoting the lever toward the other direction will produce fine coffee powder.

1 Claim, 7 Drawing Sheets

AUTOMATIC COFFEE MAKER

BACKGROUND OF THE INVENTION

1. Field of Invention

The present invention relates to coffee makers and, more particularly, to an automatic coffee maker having an improved powder fineness adjusting arrangement.

2. Related Art

Coffee mills in the shape of a mug are well known. Also, automatic drip coffee makers are well known. An automatic coffee maker with a grinding device disclosed in U.S. Pat. No. 6,827,002 by the same inventor of the present invention as closest to the present invention is specifically incorporated herein by reference.

SUMMARY OF THE INVENTION

It is therefore an object of the present invention to provide an automatic coffee maker having an improved powder fineness adjusting arrangement to control desired coffee power fineness, with the coffee maker including a valve mechanism, a grinding mechanism, a powder fineness adjusting mechanism, a cover, and a bean container. The valve mechanism consists of an electromagnetic valve combined with a micro switch to drive an extension member with one end connected to a covering board having an opening, with a spring being provided between the covering board and the electromagnetic valve. The grinding mechanism consists of a motor including an extended rotating shaft, a cylinder, two outer grinding members, and an inner grinding member. The powder fineness adjusting mechanism consists of a half-circular adjustment member, a join board, a staged abutment member, and a bearing. In a powder fineness adjustment for producing coarse coffee powder, pivoting the lever of the half-circular adjustment member toward one end of a front groove in the cover will pivot the join board and the staged abutment member and move the staged abutment member outward to push the outer grinding member and the inner grinding member outwardly so as to increase space therebetween. In addition, in a powder fineness adjustment for producing fine coffee powder, pivoting the lever toward the other end of the front groove will pivot the join board and the staged abutment member and move the staged abutment member inward to push the outer grinding member and the inner grinding member inwardly so as to decrease the space.

The above and other objects, features and advantages of the present invention will become apparent from the following detailed description taken with the accompanying drawings.

BRIEF DESCRIPTION OF THE DRAWINGS

FIG. 7 is a view similar to FIG. 4 showing the powder outlet being blocked for permitting hot water to flow in.

DETAILED DESCRIPTION OF THE INVENTION

Figure 1:
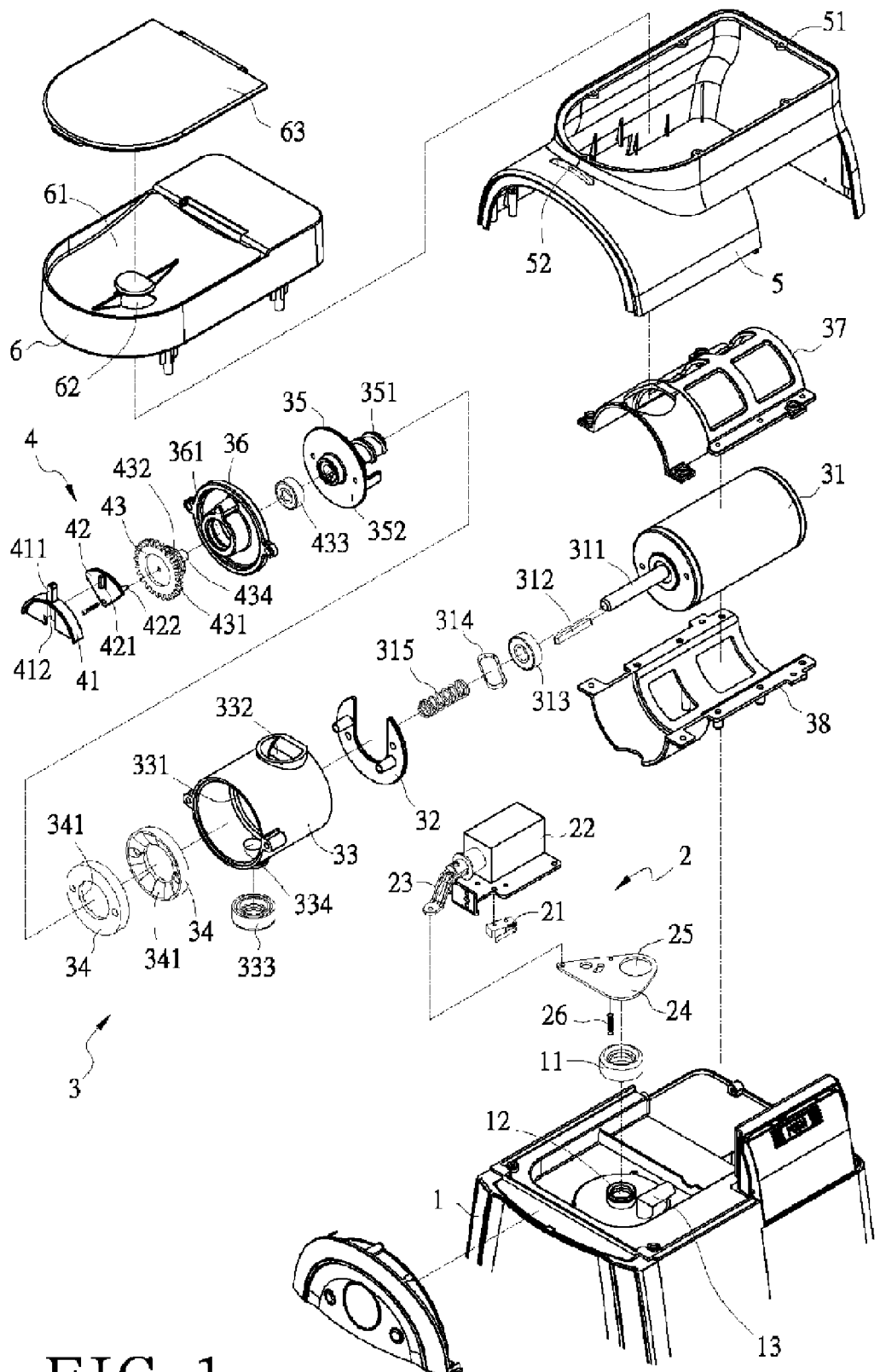
FIG. 1 is an exploded view of a preferred embodiment of an automatic coffee maker according to the invention.
Figure 2:
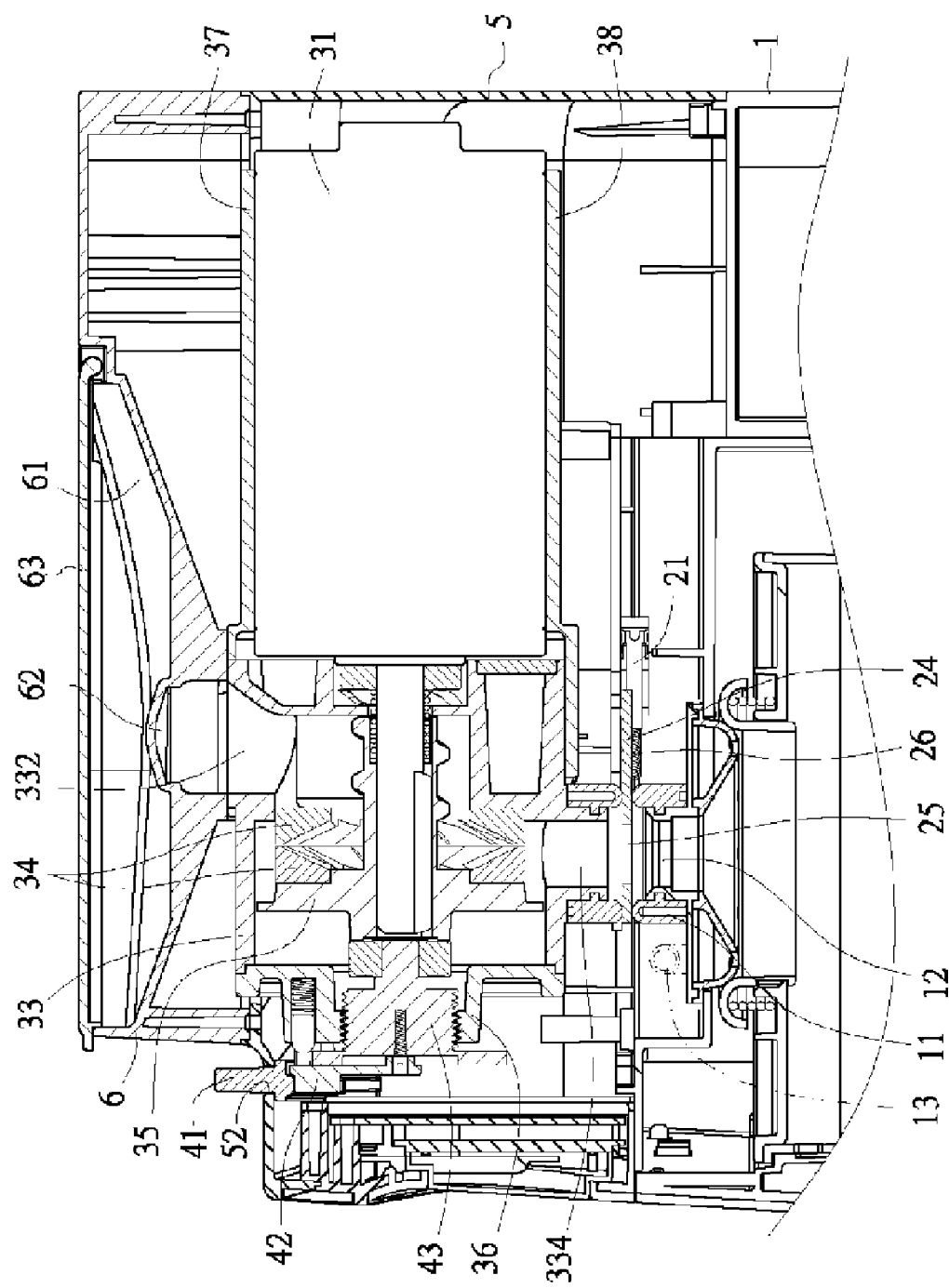
FIG. 2 is a cross-sectional view of an upper portion of the assembled coffee maker.

Referring to FIG. 1, an automatic coffee maker 1 in accordance with a preferred embodiment of the invention is shown. The coffee maker 1 comprises a valve mechanism 2, a grinding mechanism 3, a powder fineness adjusting mechanism 4, a cover 5, and a bean container 6. Each component is discussed in detail below.

The coffee maker 1 has, at its upper portion, an inflow opening 12 on a seat, a ring 11 fastened on the inflow opening 12 and a water inlet 13 besides the inflow opening 12.

The valve mechanism 2 comprises an electromagnetic valve 22 combined with a micro switch 21 to drive one end of the electromagnetic valve 22 connected to an extension member 23. A covering board 24 is connected to the other end of the extension member 23 and has an opening 25. A spring 26 is provided between the covering board 24 and the electromagnetic valve 22.

The grinding mechanism 3 comprises a motor 31 including an extended rotating shaft 311, an elongated block 312 fitted with the rotating shaft 311, a bearing 313 put on the rotating shaft 311, a spring plate 314, a spring 315, a U-shaped bulkhead 32, a cylinder 33, two outer grinding members 34, an inner grinding member 35, a front plate 36 including threads 361 on a surface of its hollow center and upper and lower shells 37 and 38. The cylinder 33 has an inward extending rim 331 at one mouth, a projected upper hopper member 332, a projected bottom powder outlet 334, and a ring-shaped member 333 fastened on the powder outlet 334. Each outer grinding member 34 has a plurality of inclined teeth 341 on one surface. The teeth 341 of one outer grinding member 34 face those of the other grinding member 34. The inner grinding member 35 includes a disc surface 352 and a hollow feed rod 351 extended through both surfaces of the disc surface 352, with the feed rod 351 formed with a lead screw thereon.

The powder fineness adjusting mechanism 4 comprises a half-circular adjustment member 41, a join board 42, a staged abutment member 43, and a bearing 433. The half-circular adjustment member 41 includes an upwardly projected lever 411 and a recess 412 provided under the lever 411. The join board 42 includes a projection 421 fitted in the recess 412 and a bar 422 distal the adjustment member 41. The staged abutment member 43 includes circumferential teeth 431 at one end, outer threads 432 distal the join board 42, and an axis 434 projected inward from a center of the threads 432. The bearing 433 is put on the axis 434 after threadedly securing the threads 432 to the threads 361 in the hollow center of the front plate 36 (i.e., the abutment member 43 and the front plate 36 are secured together).

The cover 5 comprises a top opening 51 and a front groove 52.

The bean container 6 is shaped to fit onto the ton opening 51 and comprises a reservoir 61, an opening 62 on the bottom of the reservoir 61 corresponding to the upper hopper member 332 of the cylinder 33, and a door 63 hingedly connected to one side of the reservoir 61.

Figure 3:
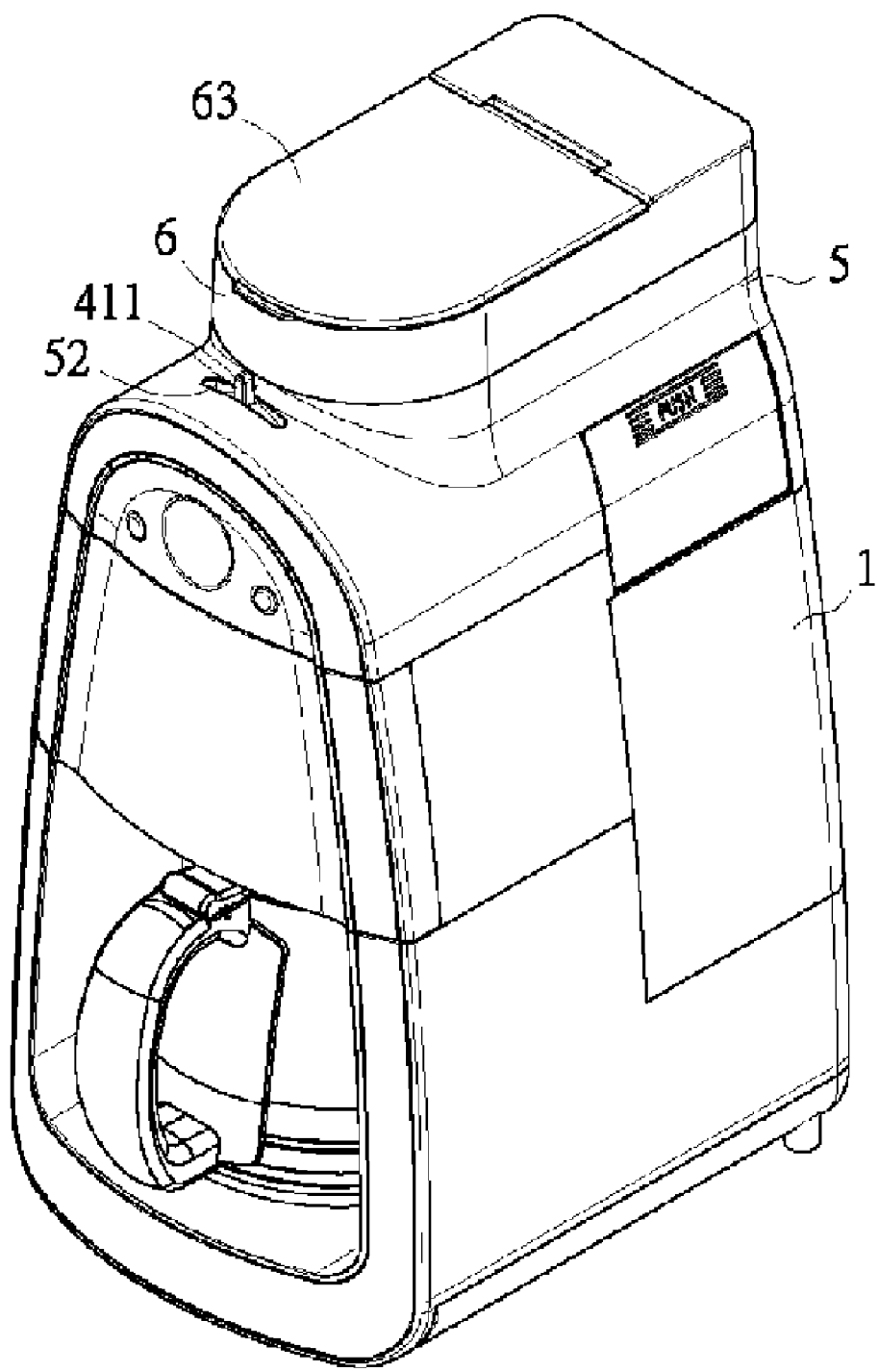
FIG. 3 is a perspective view of the assembled coffee maker.
Figure 4:
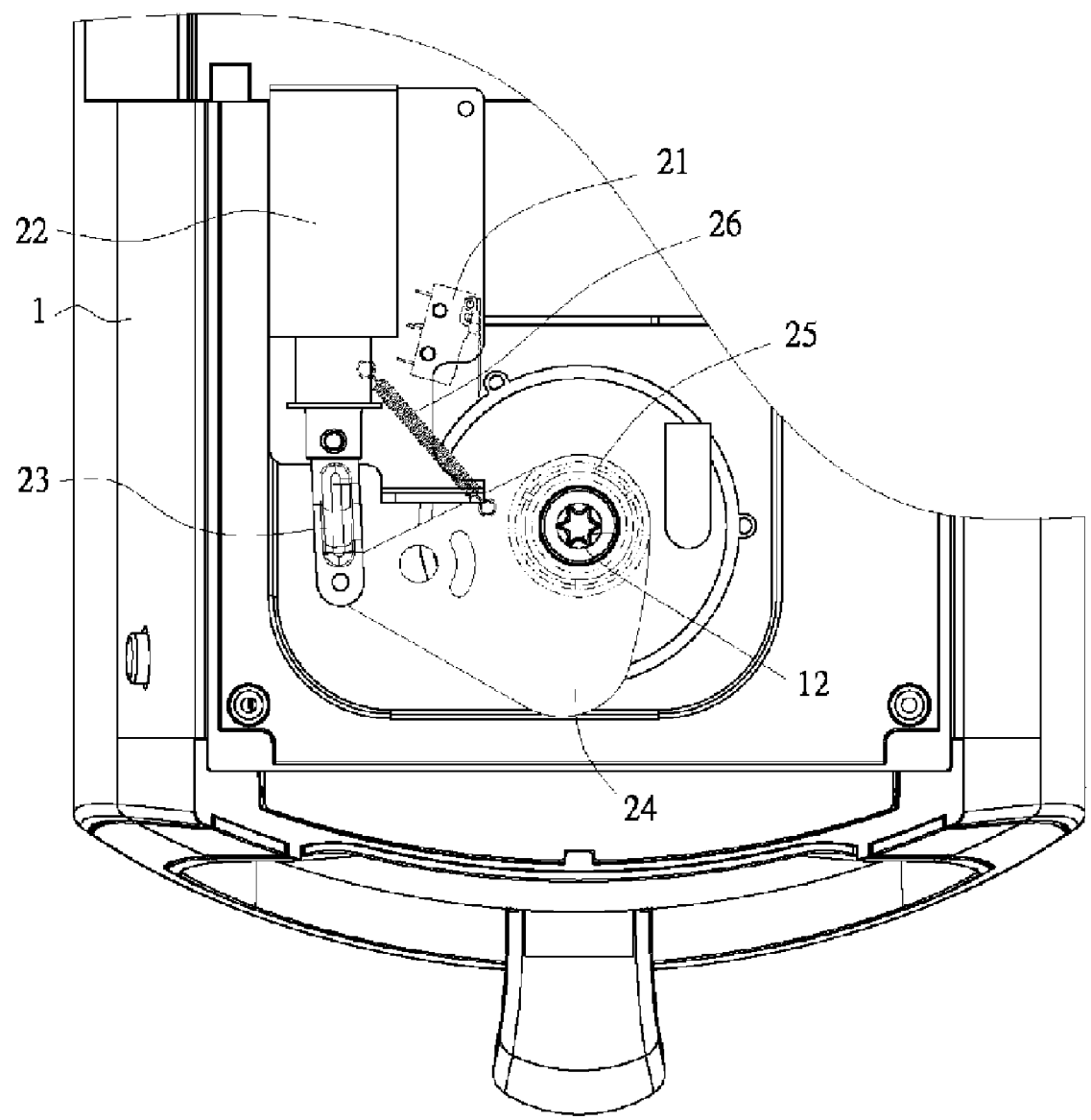
FIG. 4 is a top plan view of the assembled coffee maker showing the electromagnetic valve in a ready state.

A final assembly operation of the invention will be described in detail below. The extension member 23 connected with the electromagnetic valve 22 with the micro switch 21 is connected to the opening 25 of the covering board 24. After being pulled outwardly by attraction of the electromagnetic valve 22, the covering board 24 is pulled backwardly by the spring 26 disposed between the covering board 24 and the electromagnetic valve 22 when the electromagnetic valve 22 is loosened. The opening 25 is aligned with the inflow opening 12 by the activated electromagnetic valve 22 in a ready state of the coffee maker (see FIG. 4)

when the covering board 24 is pulled outwardly. The rotating shaft 311 of the motor 31 is inserted through the bearing 313, spring plate 314, and spring 315, and, then, the motor is inserted into the cylinder 33 and combined together by the bulkhead 32. The rotating shaft 311 is further inserted into one grinding member 34 and secured to the rim 331. The other grinding member 34 is secured around a joining portion of the disc surface 352 of the inner grinding member 35. The rotating shaft 311 is then inserted into the inner grinding member 35 in the cylinder 33 so that the spring 315 is urged against the rear end of the inner grinding member 35. The motor 31 is enclosed by the front plate 35 and the upper and lower shells 37 and 38 so as to finish the grinding mechanism 3. The grinding mechanism 3 is then fixed to the upper of the coffee maker 1. The grinding mechanism 3 is combined with the powder fineness adjusting mechanism 4. The outer threads 432 is secured to the threads 361 in the hollow center of the front plate 36 and the bearing 433 is put on the axis 434. Next, the join board 42 is secured to the abutment member 43, and the bar 422 rests between a pair of adjacent teeth 431. The projection 421 of the join board 42 are then inserted into the recess 412 of the adjustment member 41. Finally, the cover 5 is fitted to the coffee maker 1 with the lever 411 projected from the front groove 52 and with the bean container 6 disposed on the opening 51 so as to finish the automatic coffee maker 1 having an improved powder fineness adjusting mechanism 4, as shown in FIG. 3.

Figure 5:
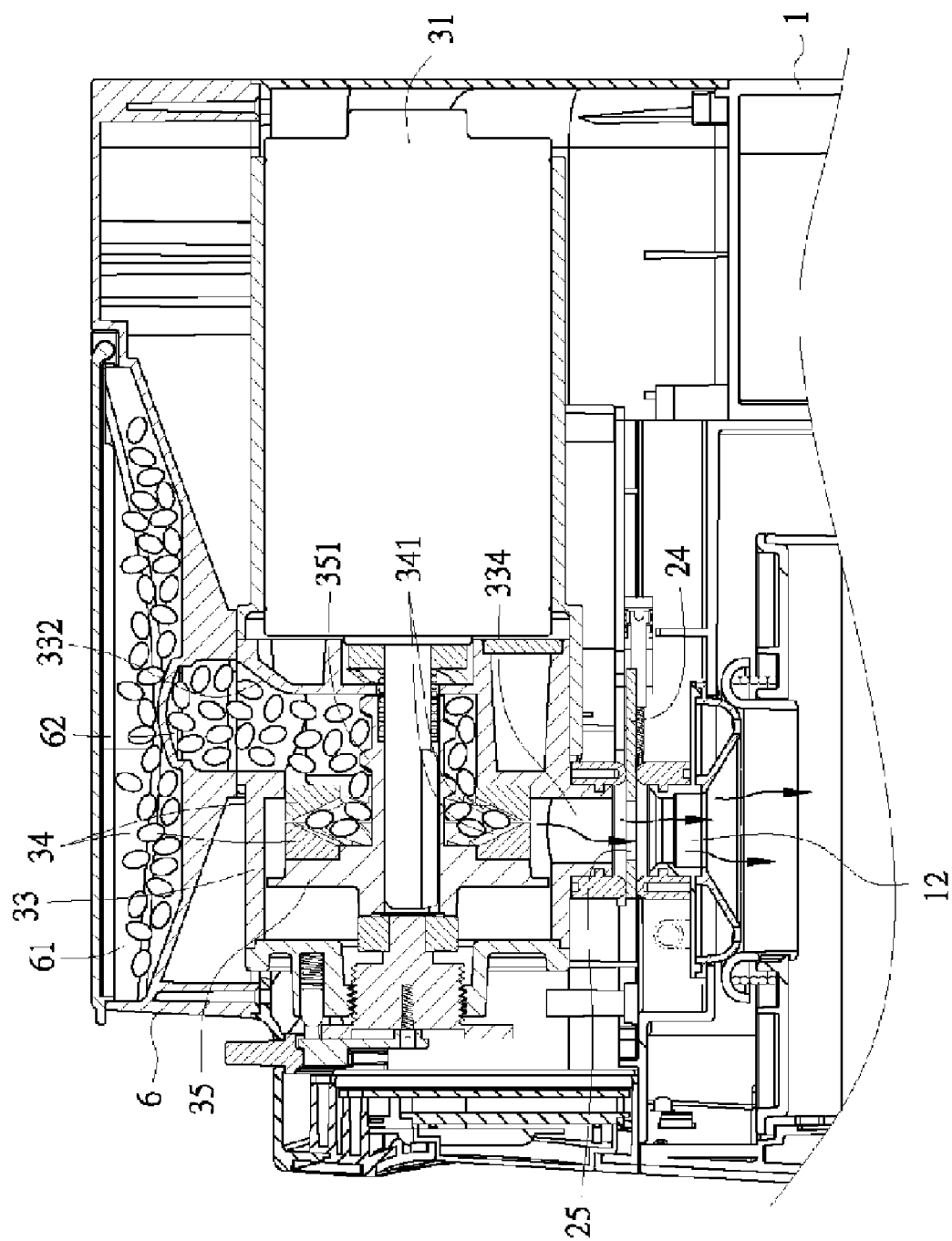
FIG. 5 is a view similar to FIG. 2 with coffee beans being fed to a space between two grinding members and being ground therein in a grinding process.

Referring to FIG. 5, a process of making coffee will now be described. Coffee beans are placed in the reservoir 61 of the bean container 6. Coffee beans will drop into the cylinder 33 by passing through the opening 62 and the hopper member 332. The rotating shaft 311 then rotates by actuating the motor 31 and, thus, the inner grinding member 35 and outer grinding members 34. The rotating screw of the feed rod 351 conveys the coffee beans into a space formed between the grinding members 34. The coffee beans are then ground into powder by the teeth 341 of both grinding members 34 in the space.

Figure 6:
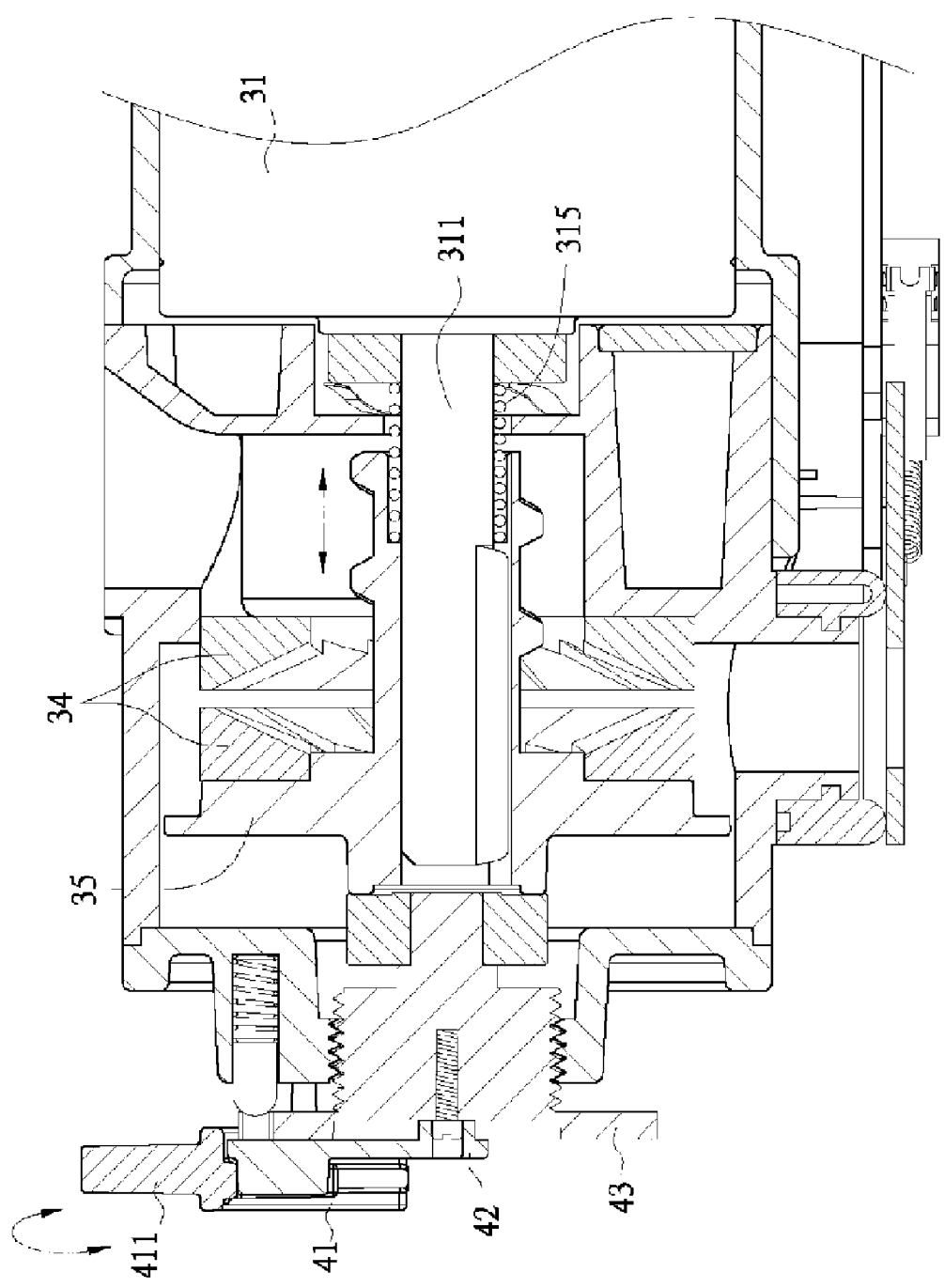
FIG. 6 is an enlarged view of a portion of FIG. 2 showing a powder fineness adjustment operation of the coffee maker.
Figure 7:
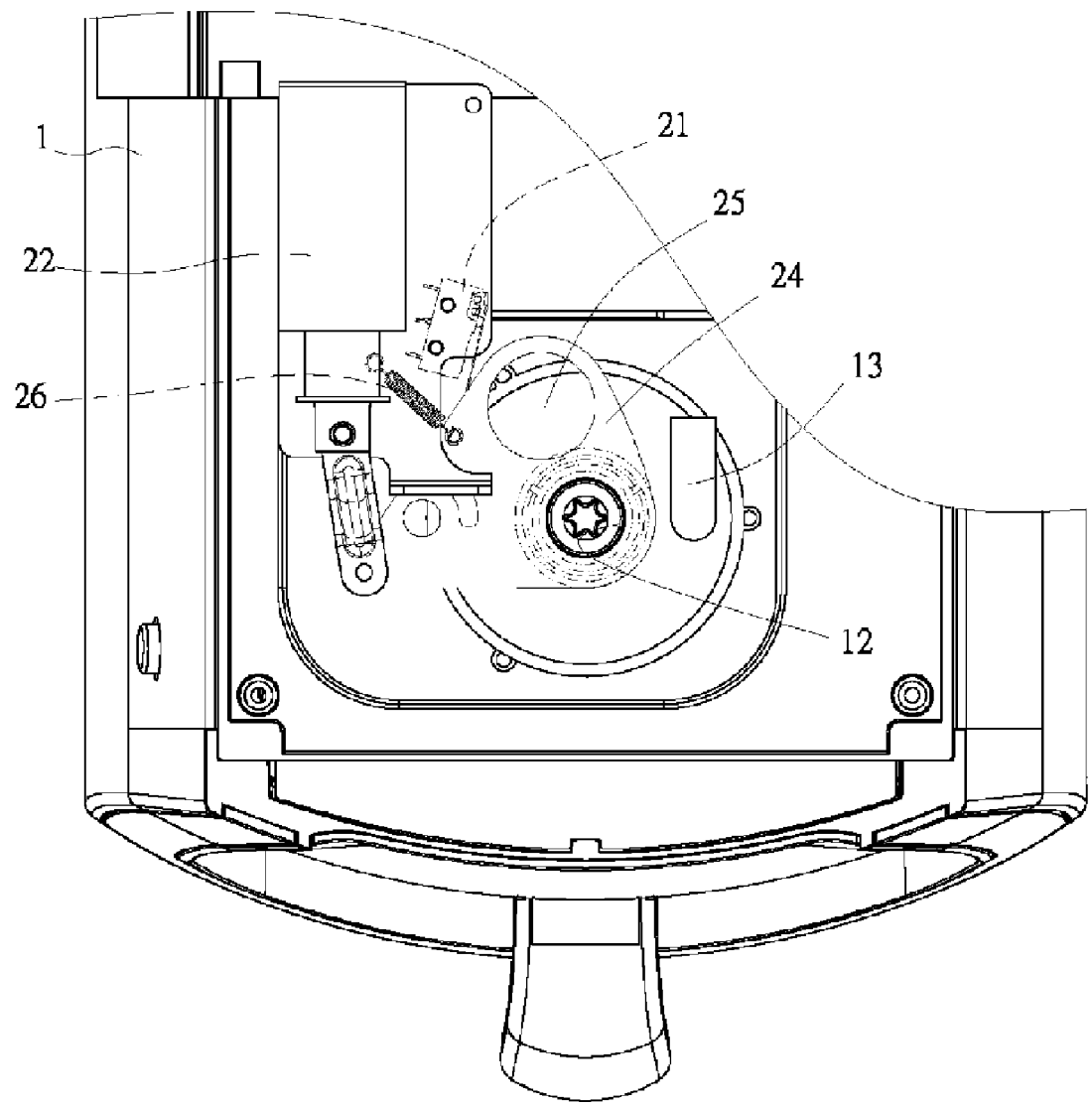

A powder fineness adjusting operation of the invention will be described in detailed below, referring to FIG. 6. As embodied, a person may pivot the lever 411 toward one end of the groove 52. Thus, both the join board 42 and the abutment member 43 pivot the same. The abutment member 43 (i.e., the axis 434) also moves outwardly. At the same time, the inner grinding member 35 is pushed outwardly by the expanding spring 315 so that the space between the grinding members 34 is increased. As a result, coarse coffee powder is produced. It is understood that the person may pivot the lever 411 toward the other end of the groove 52 for producing fine coffee powder. The coffee powder then enters the inflow opening 12 to temporarily store in a filter cup (not shown) after passing the powder outlet 334 and the inflow opening 12 (see FIG. 7). A grinding period of time is set in advance so that the electromagnetic valve 22 can be disabled when the set time is reached. In response, the covering board 24 pivots to block both the powder outlet 334 and the inflow opening 12 due to the compression of the spring 26. The micro switch 21 is then activated by the pivoting covering board 24 to perform a water boiling process. Hot water then flows from a water reservoir through the water inlet 13 into the filter cup for diluting the coffee powder. Finally, coffee drink permeates the filter cup to fall into a bowl (not shown) in the coffee maker 1. Note that steam is prevented from moving up since both the powder outlet 334 and the inflow opening 12 are blocked by the covering board 24. This can maintain the dryness of the coffee powder.

While the invention herein disclosed has been described by means of specific embodiments, numerous modifications and variations could be made thereto by those skilled in the art without departing from the scope and spirit of the invention set forth in the claims.

What is claimed is:

1. An automatic coffee maker comprising a valve mechanism, a grinding mechanism, a powder fineness adjusting mechanism, a cover having a front groove, and a bean container, wherein:
    the valve mechanism includes an electromagnetic valve combined with a micro switch to drive one end of the electromagnetic valve connected to an extension member, another end of said extension member being connected to a covering board having an opening, and a spring being provided between the covering board and the electromagnetic valve;
    the grinding mechanism includes a motor including an extended rotating shaft, an elongated block, a bearing, a spring plate, a spring, a U-shaped bulkhead, a cylinder, two outer grinding members, an inner grinding member, a front plate having threads on a center, upper and lower shells, a projected upper hopper member and a projected bottom powder outlet, with said cylinder having an inward extending rim, with each of said two outer grinding members having a plurality of inclined teeth on one surface, with said inner grinding member including a hollow feed rod formed with a lead screw thereon; and
    the powder fineness adjusting mechanism includes a half-circular adjustment member, a join board having a front and a back, a staged abutment member, and an bearing, with said half-circular adjustment member including an upwardly projected lever and a recess provided under the upwardly projected lever, with said join board including a projection on the front and a bar on the back, with said staged abutment member having one side and another side and including circumferential teeth at the one side, outer threads at the another side and an axis projected inwardly from a center of the outer threads for being received by the bearing of the powder fineness adjustment mechanism, with the bar resting between a pair of adjacent circumferential teeth of said staged abutment member;
    whereby in a powder fineness adjustment for producing coarse coffee powder, pivoting the lever toward one end of the front groove will pivot the join board and the staged abutment member and move the staged abutment member outward to push the two outer grinding members and the inner grinding member outwardly so as to increase a space therebetween; and
    in a powder fineness adjustment for producing fine coffee powder, pivoting the lever toward another end of the front groove will pivot the join board and the staged abutment member and move the staged abutment member inwardly to push the two outer grinding members and the inner grinding member inwardly so as to decrease the space therebetween.

* * * * *